Patented June 15, 1937

2,084,125

UNITED STATES PATENT OFFICE 2,084,125

CELLULOSE ETHERS

Louis H. Bock and Alva L. Houk, Philadelphia, Pa., assignors to Röhm & Haas Company, Philadelphia, Pa.

No Drawing. Application August 21, 1936, Serial No. 97,194

11 Claims. (Cl. 260—152)

This invention relates to a new class of cellulose ethers and their process of preparation. These cellulose ethers are compounds that have attached to a cellulose oxygen atom a group of the type

wherein R contains six or more carbon atoms and is an alkyl, cycloalkyl or aralkyl group.

A number of cellulose ethers have heretofore been described in the literature but no satisfactory process of preparing ones that have a relatively large substituent group has been devised. The most common etherifying agents are the organic chlorides and sulfates and when the organic groups in these agents are small, such as methyl or ethyl, they react fairly well with cellulose. With larger organic groups the reactivity of the chloride atom or sulfate group becomes progressively less so that in compounds, such as lauryl chloride, very little reaction takes place and then only with such large excesses of alkylating agent as to make the costs prohibitive.

An object of the present invention is to provide a process whereby relatively large organic groups can be introduced into cellulose. A correlative object is to provide a class of cellulose ethers having a large organic group as the ether forming group.

These objects have been attained in the present invention by placing what may be termed an "activating group" in such proximity to the inorganic portion of an etherifying agent as to materially increase its reactivity with cellulose. In copending application Serial No. 86,986, filed June 24, 1936, it is shown that the acetal group

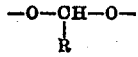

when positioned two or three carbon atoms from a halogen atom has this effect. It has also been found that an ether linkage attached to the first carbon atom will activate a halogen atom. Thus, although lauryl chloride reacts only feebly with cellulose, chloromethyl-lauryl ether reacts readily even at relatively low temperatures.

Halomethyl ethers can be prepared by treating an anhydrous mixture of an alcohol and formaldehyde with dry hydrogen halide, preferably by bubbling the gas through the chilled mixture. The following example, showing the preparation of chloromethyl-lauryl ether, is given to illustrate:

Example 1

An equimolecular mixture of lauryl alcohol and paraformaldehyde containing toluene as a diluent is cooled to below 0° C. and dry hydrogen chloride passed in until the solution is saturated. The reaction mixture is continuously stirred and kept at a temperature below 5° C. When saturated it is separated from the aqueous layer, dried over calcium chloride and distilled under reduced pressure. B. P. 127–135° C. at 6 mm. A yield of 81% of theory was obtained by this procedure.

By using other alcohols in place of lauryl alcohol and other hydrogen halides, for instance, hydrogen bromide, in place of hydrogen chloride, the other halomethyl ethers useful in the present invention can be made.

This invention contemplates preparing cellulose ethers with these etherifying agents by any of the known means, such as by reacting with alkali cellulose and by treating cellulose in the presence of caustic alkali, but the inventors prefer to use the methods disclosed and claimed in the application of Powers, Bock and Houk, Serial No. 750,128, filed October 26, 1934. By that method cellulose is dissolved in an aqueous solution of a quaternary ammonium hydroxide and the solution treated with an etherifying agent.

The following examples are given to illustrate the preparation of cellulose ethers by the present invention.

Example 2

A cellulose solution is prepared by mixing 165 grams of finely divided bleached sulfite cellulose and 1.6 liters of a 40% aqueous solution of trimethylbenzyl ammonium hydroxide in a steam jacketed Werner and Pfleiderer type mixer for two hours at a temperature between 75 and 100° C. A clear, viscous, chocolate-brown solution is thus obtained.

To 375 parts of the cellulose solution in a kettle surrounded by a cooling brine, 89 parts of chloromethyl capryl ether are slowly added over a period of two hours, during which time the mixture is continuously stirred and the temperature not allowed to rise above room temperature. The mass is let stand at room temperature for 18 hours.

The cellulose ether produced contains approximately one caryloxymethyl group per two glucose units and can be either treated with additional etherifying agent to increase the alkylation or filtered from the reaction mixture and purified by washing several times with water and then with acetone.

Example 3

To 375 parts of the cellulose solution prepared as in Example 2, 118 parts of chloromethyl lauryl ether is added over a period of one hour, the mixture being stirred and cooled during the addition. It was then stirred four hours at room temperature, heated at 45° C. for 2½ hours, and filtered and washed as in Example 2. The lauryloxymethyl cellulose produced contained approximately one lauryloxymethyl group to each glucose unit. It is soluble in toluene and aliphatic hydrocarbons. Films formed from a toluene solution are tough, transparent and much more extensible than films from cellulose or cellulose ethers having relatively small substituent groups.

Example 4 n-Decyl-oxymethyl cellulose having approximately 0.75 decyloxymethyl groups per glucose unit is prepared by adding 103 parts of n-decyl-oxymethyl chloride to 375 parts of cellulose solution in the manner described in Example 2, then heating for two hours at 45° C. and letting the mass stand at room temperature for 18 hours. It dissolves in toluene to give a viscous solution from which clear, tough films can be prepared.

Example 5

176 parts of the cellulose solution described in Example 2 are mixed with 50 parts of dioxane and 0.5 parts of trimethylbenzyl ammonium iodide. 32.5 parts of chloromethylbutoxyethyl ether are added at room temperature over a period of one hour. The mixture is then stirred for three hours after which it is warmed to and held at 60° C. for two hours. The cellulose ether was filtered and washed first with water and then with acetone. It analyzed 0.24 butoxyethoxymethyl groups per glucose unit. Other glycol or polyglycol ethers can be used in place of the butoxyethyl ether.

Example 6

To 352 parts of cellulose solution prepared as in Example 2 is added a solution of 117 parts of chloromethyl lauryl ether in 300 parts of benzene over a period of five hours, the mixture being stirred continuously during the addition. It is then stirred for two hours at 60° C. Five hundred parts of water and 500 parts of benzene are then added and the reaction mixture is filtered. The filtrate separates into two layers, the upper of which is a benzene solution of the cellulose ether together with some lauryl alcohol. This layer is separated and concentrated under vacuum to a viscous liquid. Acetone is then added whereupon the cellulose ether precipitates as a gelatinous mass. On washing several times with acetone the ether becomes a white, rubbery solid which is completely soluble in benzene or toluene.

The above examples merely illustrate the method by which a few of the ethers coming within the invention are prepared. In the process any halomethylether of the general formula

wherein X is a halogen atom and R an organic radical having six or more carbon atoms may be used. Chloromethylethers in which R has less than six carbon atoms are so highly reactive that they are decomposed by the aqueous solvent before substantial reaction with cellulose is obtained. Where R of the formula is an aliphatic group having ten or more carbon atoms in a straight chain, cellulose ethers of a relatively low degree of etherification are obtained that are soluble in hydrocarbon solvents and exhibit plasticity and extensibility not possessed by cellulose itself or the known derivatives of cellulose. Their solubility in common solvents makes them useful in coating compositions and the preparation of films which in some respect resemble rubber and can be used as moisture-proof coverings. The plasticity of this sub-group makes them useful as plasticizers for resins and cellulosic material, such as cellulose and cellulose derivatives, particularly the ethers and esters.

The cellulose used as starting material may be derived from any common sources of cellulose, such as cotton or wood pulp. In addition to the bleached sulfite cellulose used for illustration in the examples, unbleached sulfite and bleached or unbleached sulfate cellulose, regenerated cellulose, such as obtained from the viscose and cuprammonium solutions, hydrated or hydrocellulose, cellulose oxidation products and other modified cellulose, may be used. The process is also applicable to conversion products of cellulose, such as partially etherified cellulose ethers, for example methyl cellulose, ethyl cellulose and benzyl cellulose. As examples of representative etherifying agents, from which cellulose ethers in accordance with the present invention have been made, are:

1. Chloromethyl-n-octyl ether
2. Chloromethyl-capryl ether
3. Chloromethyl-n-decyl ether
4. Chloromethyl-lauryl ether
5. Chloromethyl-cetyl ether
6. Chloromethyl-octadecyl ether
7. Chloromethyl-(1-methyl-4-ethyl hexyl) ether
8. Chloromethyl-(1-methyl-4-ethyl octyl) ether
9. Chloromethyl-cyclohexyl ether
10. Chloromethyl-(4-(1,1,3,3-tetramethylbutyl) cyclohexyl) ether
11. Chloromethyl-(4-(1,1,3,3-tetramethylbutyl) phenoxyethyl) ether
12. Chloromethyl-butoxyethyl ether
13. Chloromethyl-benzyl ether
14. Chloromethyl-Δ⁹-octadecenyl ether In each of these examples R of the formula heretofore given is either a hydrocarbon group or contains, in addition to carbon and hydrogen, only ether linkages but substituents such as the halogens, chlorine and bromine particularly, nitrile, hydroxy, carbonyl, etc. may also be present.

Various modifications of the invention here disclosed will from time to time appear to persons skilled in the art. Insofar as such modifications conform to the teachings and spirit of this invention, they are intended to be covered by the appended claims.

We claim:
1. A cellulose ether containing the group

wherein R is an organic radical containing more than five carbon atoms, substituted for the hydrogen of a cellulose hydroxyl group.

2. A cellulose ether containing the group

wherein R is an aliphatic group having a straight chain of at least ten carbon atoms, substituted for the hydrogen of a cellulose hydroxyl group.

3. A cellulose ether containing the group

R—O—CH₂— wherein R is an organic hydrocarbon radical containing more than five carbon atoms, substituted for the hydrogen of a cellulose hydroxyl group.

4. A cellulose ether containing the group

R—O—CH₂— wherein R is an aliphatic hydrocarbon group having a straight chain of at least ten carbon atoms, substituted for the hydrogen of a cellulose hydroxyl group.

5. n-Decyl oxymethyl cellulose.
6. Lauryl oxymethyl cellulose.
7. Cetyl oxymethyl cellulose.
8. The process of producing cellulose ethers which comprises treating cellulose under reacting conditions with an etherifying agent of the formula

R—O—CH₂—X wherein R is an organic radical containing more than five carbon atoms and X is a halogen atom.

9. The process of producing cellulose ethers which comprises treating cellulose under reacting conditions with an etherifying agent of the formula R—O—CH₂—Cl wherein R is an aliphatic hydrocarbon group having a straight chain of at least ten carbon atoms.

10. The process of preparing cellulose ethers which comprises reacting cellulose in the presence of a quaternary ammonium hydroxide with an etherifying agent obtainable by reacting an alcohol containing at least six carbon atoms, paraformaldehyde and a hydrogen halide.

11. The process of preparing cellulose ethers which comprises dissolving cellulose in an aqueous solution of a quaternary ammonium hydroxide and treating the dissolved cellulose with a chloromethyl-alkyl ether that has at least ten carbon atoms in the alkyl group.

LOUIS H. BOCK.
ALVA L. HOUK.